(12) United States Patent
Pavelescu et al.

(10) Patent No.: US 7,784,344 B2
(45) Date of Patent: Aug. 31, 2010

(54) INTEGRATED MEMS 3D MULTI-SENSOR

(75) Inventors: Ioan Pavelescu, Bucharest (RO); Ion Georgescu, Bucharest (RO); Dana Elena Guran, Bucharest (RO); Cornel P. Cobianu, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 315 days.

(21) Appl. No.: 11/947,603

(22) Filed: Nov. 29, 2007

(65) Prior Publication Data

US 2009/0139330 A1 Jun. 4, 2009

(51) Int. Cl.
*G01P 15/125* (2006.01)
*G01P 15/08* (2006.01)

(52) U.S. Cl. ............... 73/514.32; 73/514.31; 73/510

(58) Field of Classification Search ............. 73/514.32, 73/514.31, 510, 511, 514.36, 514.38, 514.29, 73/514.16
See application file for complete search history.

(56) References Cited

U.S. PATENT DOCUMENTS

| | | | |
|---|---|---|---|
| 5,717,631 A | | 2/1998 | Carley et al. |
| 5,763,783 A | * | 6/1998 | Asada ................. 73/514.31 |
| 5,970,315 A | | 10/1999 | Carley et al. |
| 6,131,457 A | * | 10/2000 | Sato ................... 73/514.31 |
| 6,458,615 B1 | | 10/2002 | Fedder et al. |
| 6,668,614 B2 | * | 12/2003 | Itakura ................. 73/1.38 |
| 6,684,698 B2 | * | 2/2004 | Geen et al. ........... 73/504.14 |
| 6,705,164 B2 | * | 3/2004 | Willig et al. ......... 73/504.12 |
| 6,981,416 B2 | * | 1/2006 | Chen et al. ............ 73/510 |
| 7,026,184 B2 | | 4/2006 | Xie et al. |
| 7,258,012 B2 | * | 8/2007 | Xie .................. 73/514.32 |
| 7,430,909 B2 | * | 10/2008 | Adams et al. .......... 73/510 |
| 7,520,171 B2 | * | 4/2009 | Merassi et al. ........ 73/514.32 |

OTHER PUBLICATIONS

Barbour, N., et al., "Inertial sensor technology trends", *IEEE Sensors Journal*, 1(4), (2001),332-339.

Fedder, G. K., et al., "Chapter 3- Monolithically Integrated Inertial Sensors", *Advanced Micro and Nanosystems*, vol. 2, CMOS-MEMS, (2005),137-191.

Hagleitner, C., et al., "Chapter 11—Circuit and System Integration", *Advanced Micro and Nanosystems*, vol. 2 CMOS-MEMS, (2005),513-577.

Lewis, S., et al., "Integrated sensor and electronics processing for >10^8 "iMEMS" inertial measurement unit components", *IEEE International Electron Devices Meeting, 2003. IEDM '03 Technical Digest.*, (2003),39.1.1-39.1.4.

(Continued)

*Primary Examiner*—Helen C. Kwok
(74) *Attorney, Agent, or Firm*—Schwegman, Lundberg & Woessner, P.A.

(57) ABSTRACT

Apparatus, methods, and systems for sensing acceleration and magnetic fields in all three axes from a first capacitive bridge sensor having a first proof mass; and a second capacitive bridge sensor having a second proof mass located within the first proof mass. The second proof mass is coupled to the first proof mass by springs that permit movement in the second axis. Sensing of the remaining axis of interest may be done by a third and fourth capacitive bridge configured similar to that of the first and second capacitive bridge sensors. The third and fourth capacitive bridge sensors may be oriented 90 degrees off of the first and second capacitive bridge. An alternative is to locate a third capacitive bridge within the second proof mass.

19 Claims, 7 Drawing Sheets

OTHER PUBLICATIONS

Offenberg, M., et al., "Novel Process for a Monolithic Integrated Accelerometer", *The 8th International Conference on Solid-State Sensors and Actuators, 1995 and Eurosensors IX. Transducers'95.*, (1995),589-592.

Smith, J. H., et al., "Embedded micromechanical devices for the monolithic integration of MEMS with CMOS", *IEEE International Electron Devices Meeting, 1995.,* (1995),609-612.

Wiak, S., et al., "Numerical modeling of 3D intelligent comb drive accelerometer structure", *ISEF 2005 XII International Symposium on Electromagnetic Fields in Mechatronics, Electrical and Electronic Engineering*, Baiona, Spain,(Sep. 15-17, 2005),697-704.

Xiong, Xingguo, et al., "A bulk-micromachined comb accelerometer with floating interconnects", *IEEE 48th Midwest Symposium on Circuits and Systems, 2005.,* (2005),147-150.

Xiong, Xingguo, et al., "A dual-mode built-in self-test technique for capacitive MEMS devices", *22nd IEEE VLSI Test Symposium, 2004. Proceedings.*, (2004), 148-153.

Xiong, Xingguo, et al., "A Self-repairable MEMS Comb Accelerometer", *Advances in Computer, Information, and Systems Sciences, and Engineering*, (2006),75-83.

Xiong, Xingguo, et al., "Reliability Analysis of Self-Repairable MEMS Accelerometer", *21st IEEE International Symposium on Defect and Fault Tolerance in VLSI Systems, 2006. DFT '06.*, (2006),236-244.

Yazdi, N., et al., "Micromachined Inertial Sensors", *Proceedings of the IEEE*, 86(8), (Aug. 1998),1640-1659.

Yun, Weijie, et al., "Surface micromachined, digitally force-balanced accelerometer with integrated CMOS detection circuitry", *IEEE Solid-State Sensor and Actuator Workshop, 1992. 5th Technical Digest.*, (1992),126-131.

\* cited by examiner

INTEGRATED MEMS 3D MULTI-SENSOR

BACKGROUND

Micro-electro-mechanical systems (MEMS) are well known in the art. The technology is of the very small, and merges at the nano-scale into nano-electro-mechanical systems (NEMS) and Nanotechnology. MEMS are also referred to as micro machines, or Micro Systems Technology (MST). MEMS generally range in size from a micrometer to a millimeter. Due to MEMS' large surface area to volume ratio, surface effects such as electrostatics and wetting dominate volume effects such as inertia or thermal mass.

MEMS technology is finding its way into sensors and is utilized in a number of ways each and every day by electronic and mechanical systems. These systems may determine location, speed, vibration, stress, acceleration, temperature as well as a number of other characteristics. Currently, it is common practice to obtain discrete components to determine each of the characteristics the operator or system may wish to measure. Many applications in consumer electronics, automotive electronics, audio/video, camcorder, camera, cell phone, games/toys, watches, PDA, GPS handhelds, medical devices, power supply on off system, navigation system and other electronic devices may utilize multiple sensors to meet their design objectives. In addition, the overall size of the sensors should decrease with the size of the devices in which they are embedded.

DETAILED DESCRIPTION

Figure 1A:
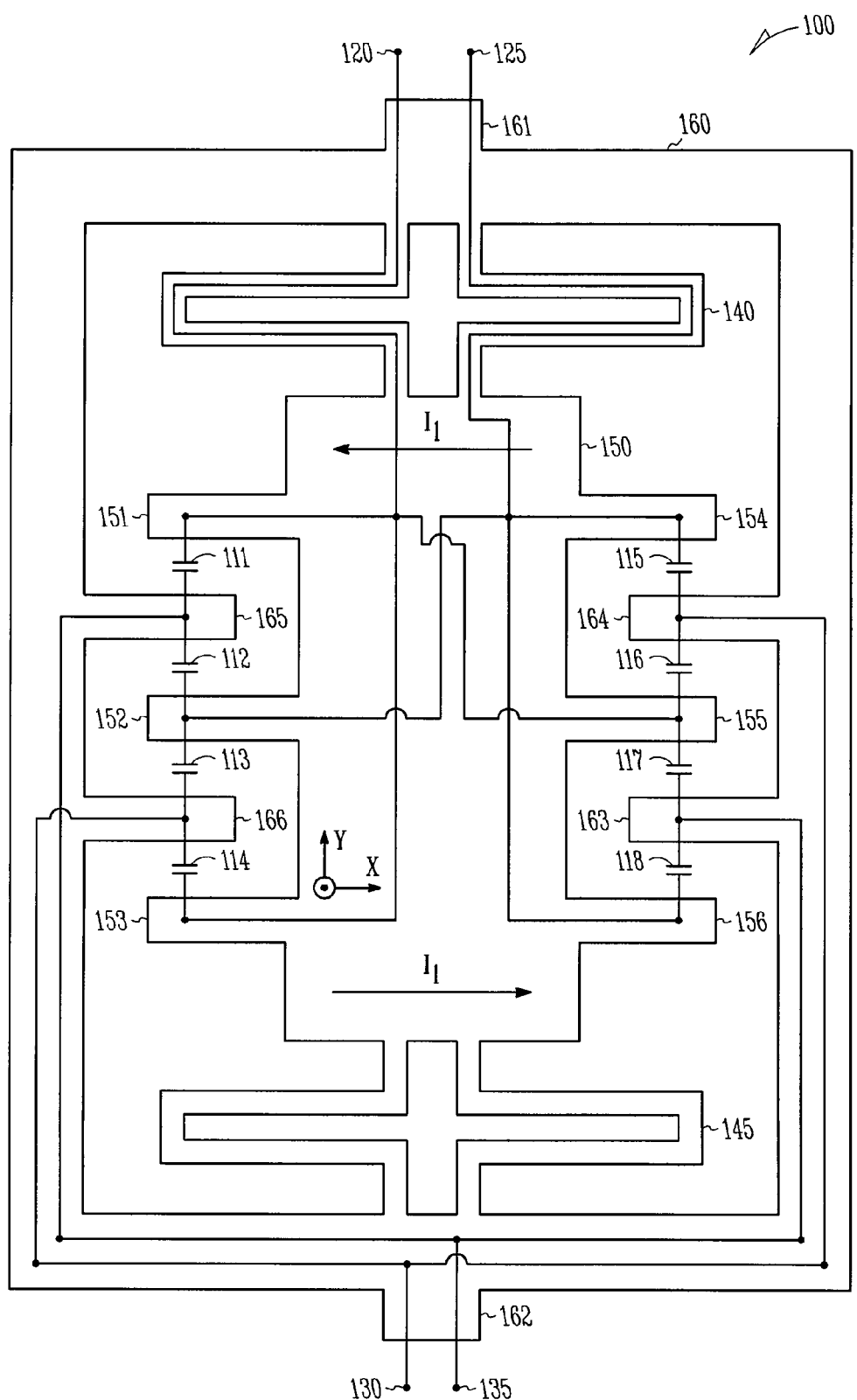
FIG. 1A is a MEMS sensor operating as a fully differential capacitive bridge.

FIG. 1A is a MEMS sensor operating as a fully differential capacitive bridge. The MEMS concept developed in FIG. 1 may also operate at the nanotechnology level for the so called integrated NEMS sensors. The capacitive bridge sensor 100, is a simplified sensor with eight capacitive elements. The capacitive bridge sensor 100 has a proof mass 150 that moves along the y-axis. The proof mass 150 is supported by springs 140 and 145. Springs 140 and 145 permit movement in the y-axis and minimize movement in the x-axis and z-axis. Proof mass 150 incorporates fingers 151, 152, 153, 154, 155, and 156. Within fingers 151, 153, and 155, voltage from node 120 is provided to energize the fingers. Within fingers 152, 154 and 156, voltage 125 is provided also to energize the fingers. The proof mass 150 and springs 140 and 145 are mounted within a body 160 that is anchored at anchor points 161 and 162. The body 160 also contains fingers 163, 164, 165, and 166. The fingers, 163, 164, 165, and 166, form a comb structure common for MEMS capacitive sensors with fingers 151, 152, 153, 154, 155, and 156. The empty space between the fingers forms a capacitive sensor sensitive to the movement of the proof mass 150. These capacitors 111, 112, 113, 114, 115, 116, 117, and 118 are shown within the comb structure of proof mass 150 and body 160. For example, capacitor 111 is formed by fingers 151 and 165. Fingers 163 and 165 are electrically connected to node 135 which is utilized to provide a first output from capacitive bridge sensor 100. Fingers 164 and 166 are electrically connected to node 130 which provides a second output from capacitive bridge sensor 100. Nodes 120 and 125 provide an alternating current (ac) voltage input to capacitive bridge sensor 100, and nodes 120 and 125 are normally 180 degrees out of phase and provide either a sinusoidal or square wave input. The inputs at nodes 120 and 125 are utilized to energize capacitive bridge sensor 100. When the proof mass 150 is positioned with respect to the body, so that there is the same gap distance (d) exists between the fingers, the voltage difference between the nodes 130 and 135 may be equal to zero. As proof mass 150 moves relative to body 160, the differential voltage changes across nodes 130 and 135. This differential voltage may be used to determine how far proof mass 150 moved and in what direction. A schematic representation of capacitive bridge sensor 100 is provided as FIG. 1B.

Figure 1B:
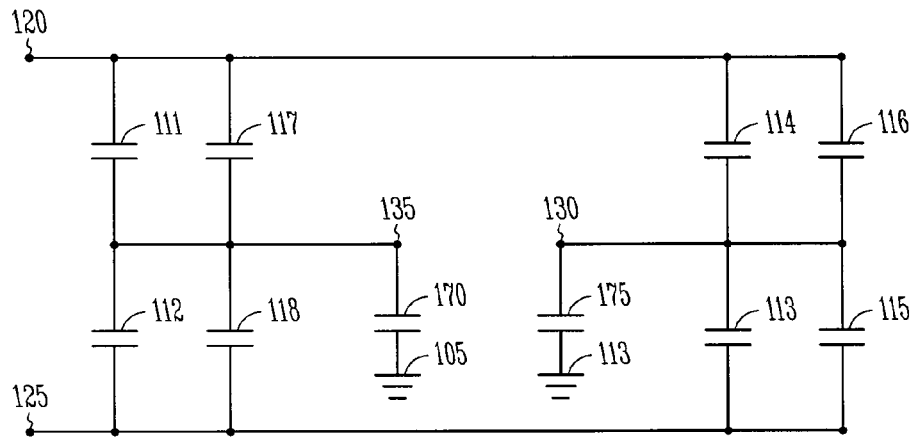
FIG. 1B is a schematic diagram of the fully differential capacitive bridge of FIG. 1A.

FIG. 1B is a schematic of a fully differential capacitive bridge for displacement detecting as shown in FIG. 1B. The capacitive bridge sensor 100 comprises illustrates the eight capacitive sensors 111, 112, 113, 114, 115, 116, 117, and 118. A first end of capacitive sensor 111 is connected in parallel to capacitive sensor 117 and to a first end of capacitive sensor 114 and to an ac voltage source provided at node 120. Capacitive sensor 114 is in connected in parallel to capacitive sensor 116. The first end of capacitive sensor 112 is connected to a first end of capacitive sensor 113 and a second ac voltage source at node 125. Capacitive sensor 112 is also connected in parallel to capacitive sensor 118. Capacitive sensor 113 is connected in parallel to capacitive sensor 115. The second end of capacitive sensor 111 is connected to the second end of capacitive sensor 112 and an output 135. The second end of capacitive sensor 114 is connected to the second end of capacitive sensor 113 and to an output 130. The outputs 130 and 135 are also shown connected to capacitors 175 and 170 respectively. The capacitors 170 and 175 represent the parasitic capacitance of capacitive bridge sensor 100 and are connected to a ground 105. The differential voltage from output 130 and 135 provides the output voltage to a conditioning and processing interface such as an ASIC (application specific integrated circuit), integrated on same chip (not shown). The signal conditioning circuit may amplify the differential from outputs 130 and 135 electronically from the capacitive bridge sensor 100, thereby increasing the gain. The highest motional sensitivity may be achieved when the capacitors in the bridge (111, 112, 113, 114, 115, 116, 117, and 118) can change value with the proof mass displacement. As an example, when the proof mass 150 is moving toward +y direction, the capacitances 111, 113, 115 and 117 are decreasing their values with a certain amount, while the capacitances 112, 114, 116, 118 are increasing with the same amount. In some other embodiments of capacitive bridge sensors two of the capacitors may remain fixed, and in this case motional sensitivity is half that of a fully differential bridge. The voltage sources 120 and 125 provide a balanced ac modulation voltage (sinusoidal or square wave), across the bridge to induce movement in the bridge.

For a capacitive bridge sensor 100 that measures acceleration, a simplified formula may be used:

$$\frac{Vout}{a_{ext}} = \frac{1}{x\omega_r^2}\left[\frac{2Vm(C_1 - C_2)}{C_1 + C_2 + C_p}\right] \cong \frac{2Vm}{\omega_r^2 d\left(1 + \frac{C_p}{2C_0}\right)} \text{ where } C_0 = C_i|_{x=0};$$

$$i = 1, 2, 3, 4$$

Vout is the voltage differential from nodes 130 and 135. $a_{ext}$ is the external acceleration of the sensor. $\omega_r = 2\pi f_r$ where $f_r$ is the modulation frequency of the voltage source of nodes 120 and 125 and $\omega_r$ r is the un-damped mechanical resonant frequency of the proof mass. d is the gap between the fingers of the capacitive bridge when the proof mass is not displaced and x is the displacement of the proof mass. Cp is the parasitic capacitance of the system represented by capacitors 170 and 175. Finally $C_1$ is represented by capacitor 111 in parallel with capacitor 117, $C_2$ by capacitor 112 in parallel with capacitor 118, $C_3$, by capacitor 114 in parallel with capacitor 116 and $C_4$ by capacitor 113 in parallel with capacitor 115. A more detailed explanation of the operation of capacitive bridge sensors may be found in chapters 3 and 11 of the "Advanced Micro and Nanosystems, Volume 2 CMOS-MEMS" Edited by H. Balters, O. Brand, G. K. Fedder, C. Hierold, J. Korvink, and O. Tabata.

Capacitive bridge sensor 100 may also sense (by a comb capacitive detection structure) changes in magnetic fields by providing a current flow $I_1$. To sense the magnetic field in the z-axis, current $I_1$ is provided across proof mass 150. When the current is applied on the x direction the magnetic field oriented in the z direction generates an electromagnetic force, which induces movement of the proof mass 150. This may result in a change in the output of capacitive bridge outputs at nodes 130 and 135 which may be utilized to calculate the change in the absolute magnetic field. Using a 3D structure for simultaneous detection of the acceleration and magnetic field components, it may be possible to determine location of the sensor. For example, the direction of magnetic north may be determined.

Figure 1C:
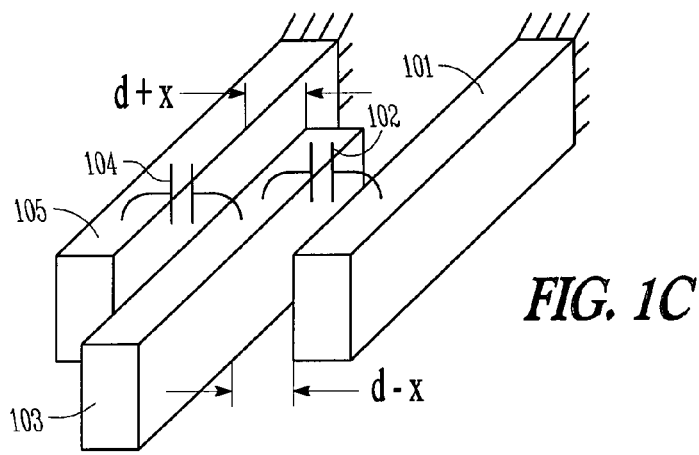
FIG. 1C illustrates capacitive bridge sensing for lateral movement.

FIG. 1C illustrates capacitive bridge sensing for lateral movement. Sensing of lateral movement for a capacitive bridge sensor utilizes a comb structure as illustrated in FIG. 1C. Interdigitated beam fingers 101, 103, and 105, referred to as combs form the sidewall capacitors 102 and 104. Fingers 101 and 105 are fixed in position in the same manner as fingers 163, 164, 165 and 166 are in FIG. 1A. Finger 103 moves in a lateral in a similar fashion to Fingers 151, 152, 153, 154, 155, and 156. The capacitive values of capacitors 102 and 104 changes with the movement of finger 103. When finger 103 is stationary, the space between fingers 103 and 101 and between fingers 103 and 105 is a distance d. As finger 103 moves towards finger 101 the space between fingers 103 and 101 becomes "d−x", where x represents the distance moved by finger 103. At the same time the distance between fingers 103 and 105 becomes "d+x". As finger 103 moves toward finger 101 the capacitance of capacitor 102 increases and the capacitance of capacitor 104 decreases. The change in capacitive values of capacitive bridges 102 and 104 is sensed by the bridge sensors illustrated in FIG. 1B. In this case the sensor in FIG. 1 C is a half bridge sensor.

Figure 1D:
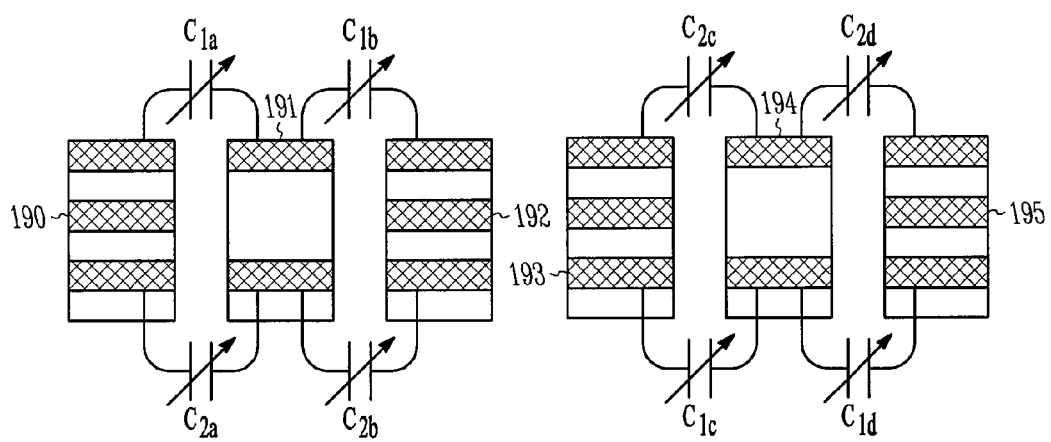
FIG. 1D illustrates capacitive bridge sensing for vertical movement.

FIG. 1D illustrates capacitive bridge sensing for vertical movement. The interdigitated fingers 190, 191 and 192 form four capacitors $C1_a$, $C1_b$, $C2_a$, $C2_b$. The dark sections of the fingers form the capacitor's electrodes. Fingers 190 and 192 are moveable and finger 191 is fixed. The interdigitated fingers 193, 194 and 195 form four capacitors $C1_c$, $C1_d$, $C2_c$, and $C2_d$. Finger 194 may move in a vertical direction, while fingers 193 and 195 are fixed. As fingers 190 and 192 or finger 194 move in a vertical direction either up or down, the capacitive bridges change values as discussed in FIG. 1A, and FIG. 1B. When the mobile beam, finger 194 moves up the capacitance value of $C2_c$ and $C2_d$ decreases due to the area of overlap for the electrodes decreasing. At the same time the capacitive values for capacitors $C1_c$, $C1_d$ increases. Capacitors $C1_c$, $C1_d$, $C2_c$, and $C2_d$ are interconnected electrically in such a way so as to form a full capacitive bridge.

Figure 2:
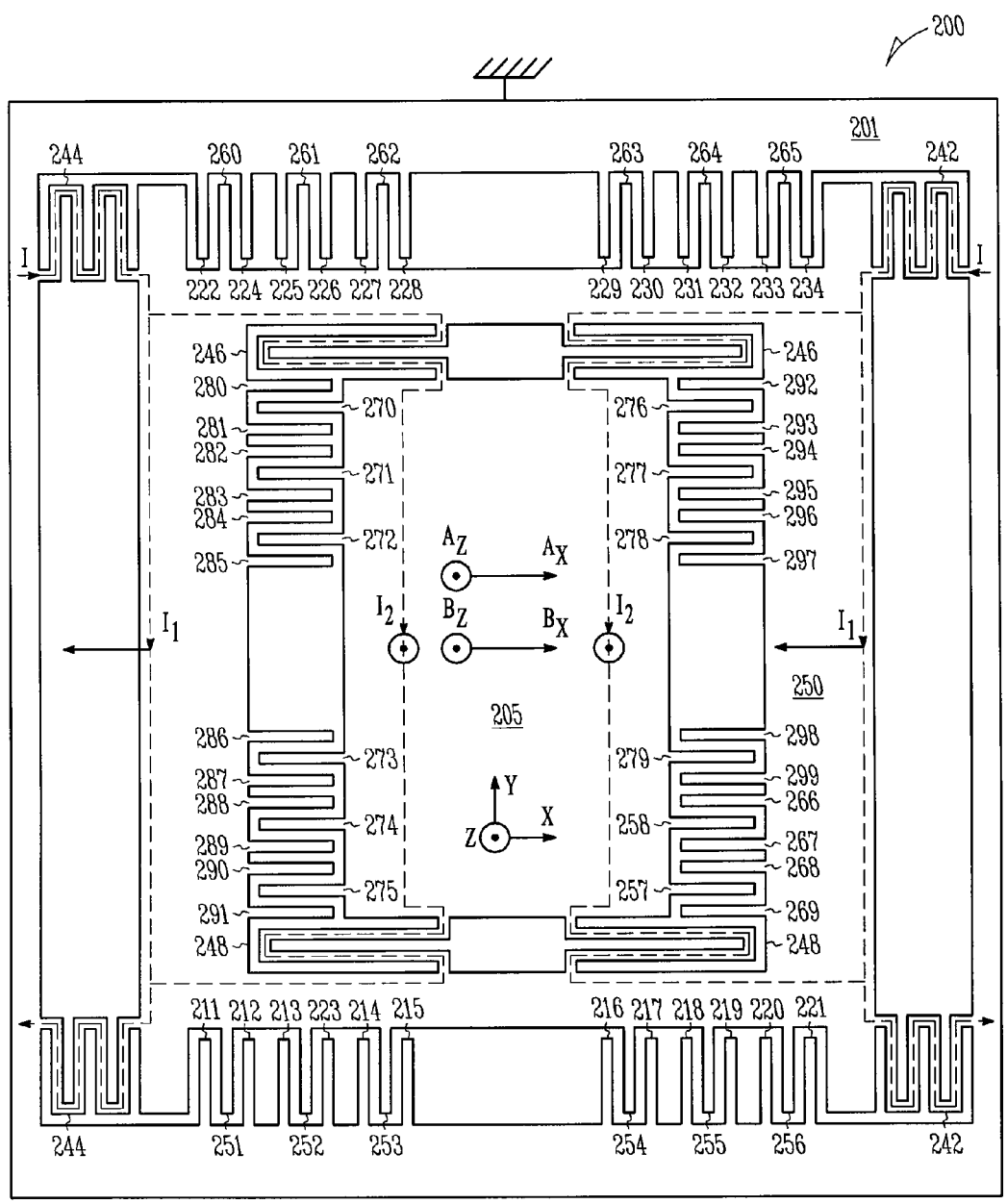
FIG. 2 illustrates a 2 axis capacitive bridge sensor according to an example embodiment.

FIG. 2 illustrates a two axis capacitive bridge sensor according to an example embodiment. Capacitive bridge sensor 200 illustrates a bridge sensor capable of sensing both acceleration and magnetic field in the x and the z axis. Capacitive bridge sensor 200 incorporates a first (external) proof mass 250 supported by lateral springs 242 and 244. To simplify the illustration example, here, the proof mass 250 incorporates twelve fingers similar to those described in FIG. 1 C. For most applications a significantly larger number of fingers may be used to achieve an increased capacitance value for the comb sensing capacitors. Fingers 251, 252, 253, 254, 255, 256 are on a first side of proof mass 250. Fingers 260, 261, 262, 263, 264, and 265 are on a second side of proof mass 250. The supporting structure 201 supports lateral springs 242 and 244. In addition supporting structure 201 incorporates a plurality of fingers 211 through 234 that combined with fingers 201 through 256 and fingers 260 through 265 create a comb structure similar to that shown in FIG. 1. The fingers 211 through the capacitive bridge sensors to sense x axis acceleration as discussed in FIG. 1. The voltage source and sensor electrical connections are not shown but are similar to those illustrated in FIG. 1A. Fingers 251, 252, 253, 254, 255, 256, 260, 261, 262, 263, 264, 265 and fingers 211, 212, 213, 214, 215, 216, 217, 218, 219, 220, 221, 222, 224, 225, 226, 227, 228, 229, 230, 231, 232, 233 and 234 form capacitive bridges that may be used to sense movement of proof mass 250 in the x-axis. This movement may be due to acceleration, electrostatic force (self-test) and/or electromagnetic force. Four sets of fingers such as (222, 260, 224), (233, 265, 234), (211, 251, 212), and (220, 256, 221) are used for acceleration sensing.

In addition to sensing the acceleration in the x-axis, by providing a current $I_1$ through proof mass 250, sensing of the magnetic field in the z-axis may be sensed, as indicated by $B_z$ sensing. The capacitive bridge utilizes four sets of fingers such as (227, 262, 228), (229, 263, 230), (214, 253, 215), and (216, 254, 217). The magnetic field may be detected when the current I is switched-on. The current $I_1$, which traverses the external proof mass 250 in y direction, generates the electromagnetic force $F_{em}(B_z)$ in x direction, which produces a displacement in x direction, detected by corresponding $B_z$ sensing elements. The displacement in x direction in the presence of magnetic field is a superposition of the displacement due to acceleration $a_x$ and the displacement due to magnetic field $B_z$. The measured magnetic field $B_z$ may be perturbed by acceleration. When the current I is switched-off, the sensor may measure the acceleration with the corresponding four sets of fingers. Subtracting this measured acceleration from the $B_z$ measurement we can obtain purely value of $B_z$. Thus, by commuting on-off the current I, the effect of the acceleration on the magnetic field can be easily compensated.

When sensing acceleration in the x-axis or the magnetic field in the z-axis, the fingers operate as shown in FIG. 1C are utilized. As we have mentioned, four sets of fingers such as (222, 260, 224), (233, 265, 234), (211, 251, 212), and (220, 256, 221) are used for acceleration sensing and sets of fingers such as (227, 262, 228), (229, 263, 230), (214, 253, 215), and (216, 254, 217) may be utilized to sense the magnetic field in the z-axis. The remaining set of fingers: (225, 261, 226), (231, 264, 232), (213, 252, 223), and (218, 255, 219) may be utilized for self test. Sets of fingers such as (222, 260, 224), (233, 265, 234), (211, 251, 212), and (220, 256, 221) used for detection of the acceleration $a_x$ can by omitted and the acceleration can be detected by sets of fingers (227, 262, 228), (229, 263, 230), (214, 253, 215), and (216, 254, 217), utilized to sense the magnetic field in the z-axis, by commuting on-off the current I, and implicitly the current $I_1$.

A second (internal) proof mass 205 is located within and contained by external proof mass 250. Proof mass 205 is supported by vertical springs 246 and 248 coupled to proof mass 250. Vertical springs 246 and 248 permit movement in the z-axis and minimize movement in the x and y axis. Proof mass 205 incorporates fingers 257, 258, 270, 271, 272, 273, 274, 275, 276, 278 and 279 to form a capacitive bridge with fingers 266, 267, 268, 269, 280, 281, 282, 283, 284, 285, 286, 287, 288, 289, 290, 291, 292, 293, 294, 295, 296, 297, 298 and 299 on the inner portion of proof mass 250. By locating proof mass 205 in the center portion of proof mass 250, it is possible to sense both x and z axis acceleration and x and z axis magnetic fields. Proof mass 205 may sense z-axis acceleration and x-axis magnetic field as proof mass 205 moves in the vertical direction as permitted by vertical springs 246 and 248.

To sense magnetic field in the x-axis a second current $I_2$ is applied to proof mass 255. The current $I_2$, which traverses the internal proof mass 205 in y direction, generates the electromagnetic force $F_{em}(B_x)$ in z direction, which produces a displacement in z direction, detected by corresponding $B_x$ sensing elements.

Proof mass 205 may sense z-axis acceleration as proof mass 205 moves in the vertical direction as permitted by vertical springs 246 and 248. The fingers related to movement of proof mass 205 operate as illustrated with FIG. 1D. In addition fingers may be paired as discussed above with sets for determining z-axis acceleration, sets for x-axis magnetic field and self testing. Sets of fingers (280, 270, 281), (290, 271, 291), (292, 276, 293), and (268, 257, 269) may be utilized to sense z-axis acceleration. Sets of fingers (284, 272, 285), (286, 273, 287), (296, 278, 297), (298, 279, 299) may be utilized for x-axis magnetic field sensing. The remaining set of fingers: (282, 271, 283), (288, 274, 289), (294, 277, 295), and (266, 258, 267) may be utilized for self test. Sets of fingers such as (280, 270, 281), (290, 271, 291), (292, 276, 293), and (268, 257, 269) used for detection of the acceleration $a_z$ can by omitted and the acceleration can be detected by sets of fingers (284, 272, 285), (286, 273, 287), (296, 278, 297), (298, 279, 299), utilized to sense the magnetic field in the x-axis, by commuting on-off the current I, and implicitly the current $I_2$.

Figure 3:
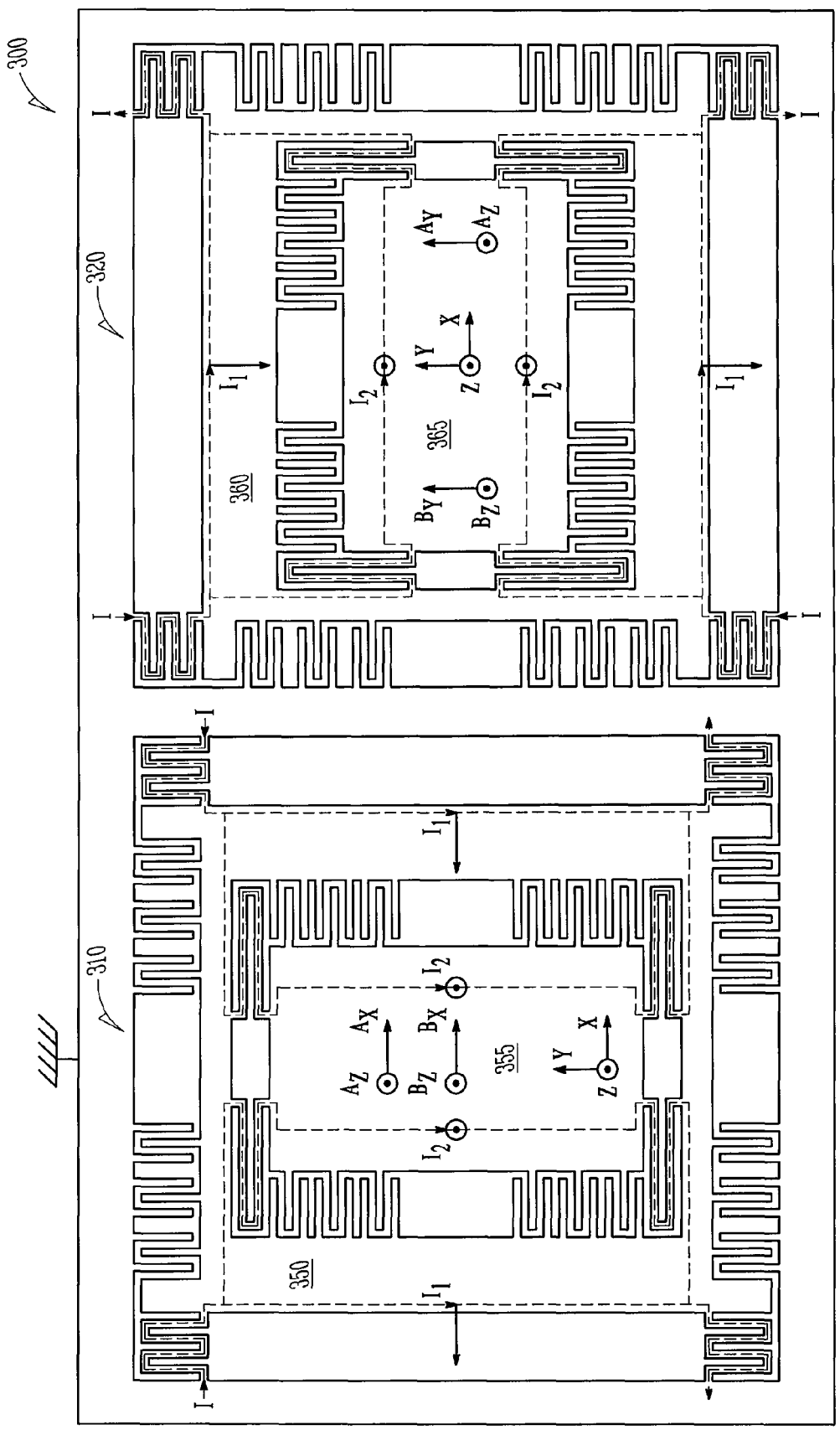
FIG. 3 illustrates a three axis capacitive bridge sensor according to an example embodiment.

FIG. 3 illustrates a three axis capacitive bridge one-chip sensor according to an example embodiment. The three axis capacitive bridge sensor 300 utilizes a pair of sensors 310 and 320 as described in FIG. 2, with the second sensor 320 rotated 90 degrees from the first sensor to allow for sensing along the y-axis for both acceleration and magnetic field. Sensor 320 may also sense z-axis acceleration and magnetic field if desired. Sensors 310 and 320 may be manufactured on the same chip to minimize the overall footprint of the three axis capacitive bridge sensor 300. On the same chip, the electronic circuit for signal conditioning and processing from capacitive bridges may be integrated and thus we obtained an integrated MEMS with the sensor and associated conditioning and processing electronics on the same chip The first sensor 310 comprises a first (external) proof mass 350 to sense x-axis acceleration and z-axis magnetic field. A second (internal) proof mass 355 is located within proof mass 350 and is utilized to sense z-axis acceleration and x-axis magnetic field variations. The second sensor 320 comprises a first proof mass 360 which senses y-axis acceleration and z-axis magnetic field. A second proof mass 365 is located within proof mass 360 and is utilized to sense z-axis acceleration and y-axis magnetic field variations. By combining the two sensors on a single chip, the sensors can sample acceleration and magnetic fields in all three axes. The outputs of the sensors may be utilized to determine changes in location for the sensor. As is common knowledge, from acceleration it is possible to determine a change in velocity. If the sensor is located at a predetermined location, it is possible to determine acceleration, and velocity in all three axes, thereby permitting the user to determine location. In addition, by determining the earth's magnetic fields corrected for any acceleration effect, location may be tracked much as one uses a compass.

Figure 4:
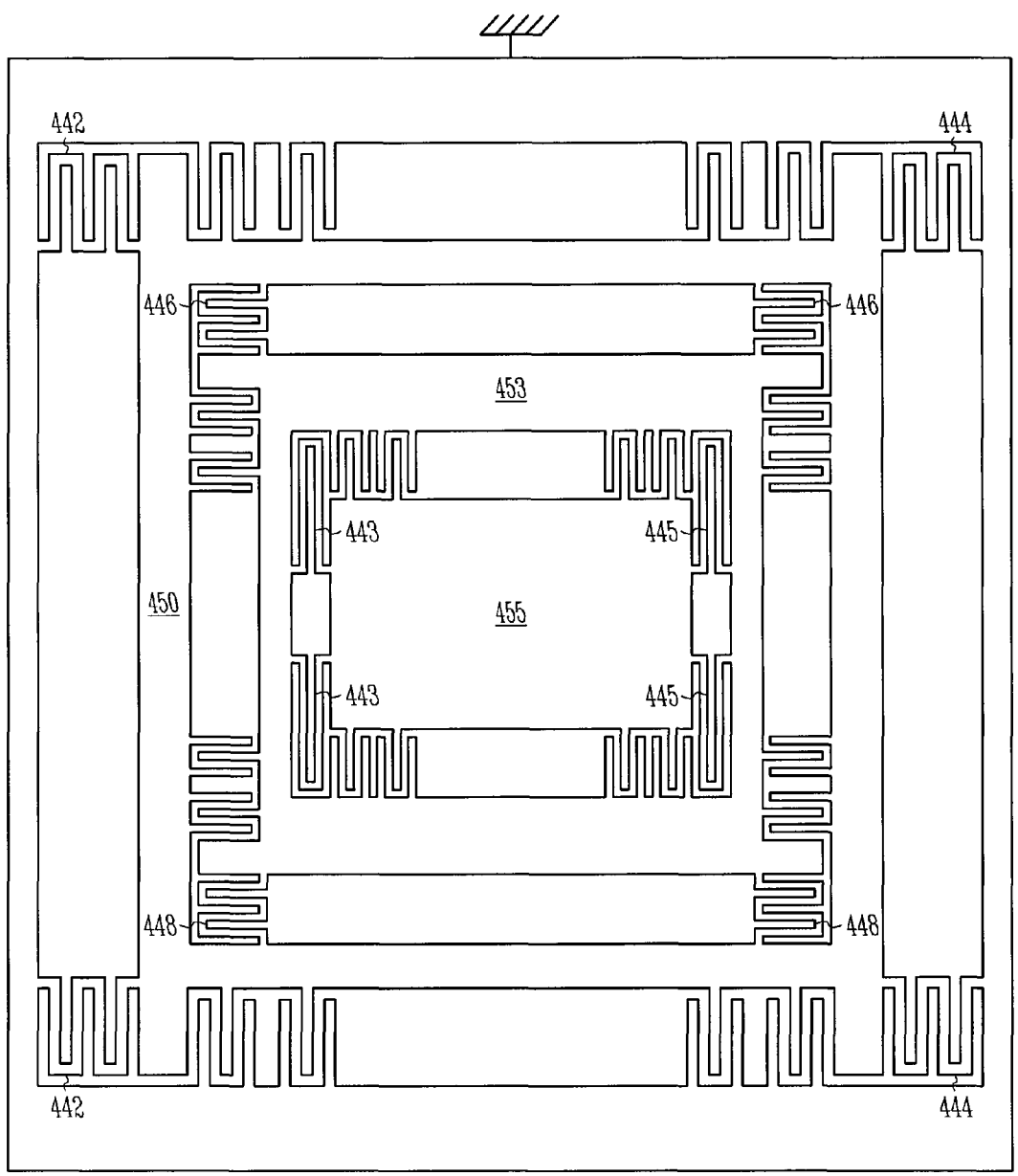
FIG. 4 illustrates a second embodiment of a three axis capacitive bridge sensor according to an example embodiment.

FIG. 4 illustrates a second embodiment of a one-chip three axis capacitive bridge acceleration sensor according to an example embodiment. As an alternative to the design of FIG. 3 a three axis sensor 400 is illustrated with a first proof mass 450 supported by lateral springs 442 and 444. Proof mass 450 may be utilized to sense x-axis acceleration. Proof mass 453 may be mounted within proof mass 450 as illustrated in FIG. 2. Proof mass 453 may be supported by lateral springs 446 and 448. Proof mass 455 may be utilized to sense z-axis acceleration. Proof mass 455 may be mounted within proof mass 453. Proof mass 455 may be supported by vertical springs 443 and 445. Proof mass 453 is oriented 90 degrees from proof mass 450. As a result, proof mass 453 may be utilized to sense y-axis acceleration.

Figure 5:
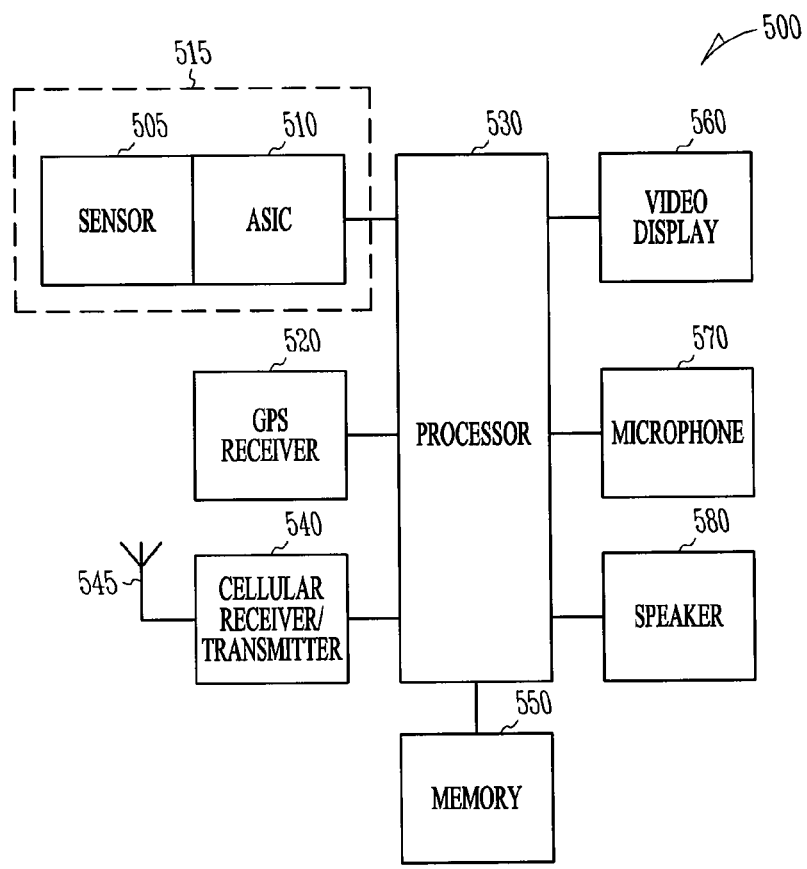
FIG. 5 illustrates a system incorporating an example embodiment.

FIG. 5 illustrates a system incorporating an example embodiment. The system 500 may include a processor 530 for processing inputs and providing outputs. Sensor 505, such as the sensor illustrated in FIG. 2, FIG. 3 or FIG. 4 may be coupled on the same chip to an application-specific integrated circuit (ASIC) 510 and thus obtaining an integrated MEMS 3D sensor 515. ASIC 510 may translate the outputs of sensor 505, to determine acceleration and magnetic field in all three axes. Processor 530 may receive an output from an ASIC 510. Processor 530 may also receive an input from a Global Positioning System (GPS) receiver 520. GPS receiver 520 may have errors introduced into its determination of location due to signal reflections or intentional errors introduced by a GPS transmitter. To determine if an error has occurred, system 500 may begin at a known location and then calibrate corrections for errors in data received by GPS receiver 520. As the system 500 moves, ASIC 510 may track acceleration and magnetic field movement, and these data may be used to correct for additional errors in data received by GPS receiver 520.

System 500 may also include a cellular receiver/transmitter 540 connected to an antenna 545. The cellular receiver/transmitter 540 may be connected to processor 530. System 500 may also include a memory 550 to store data from ASIC 510, as well as a video display 560 to display information derived by ASIC 510. Memory 550 may be located on the same substrate as ASIC 510. In addition, system 500 may include a microphone 570 and a speaker 580 to permit voice control or inputs to and from processor 530. For example, if system 500 were a cellular phone, ASIC 510 may be useful in determining the location of system 500.

Figure 6:
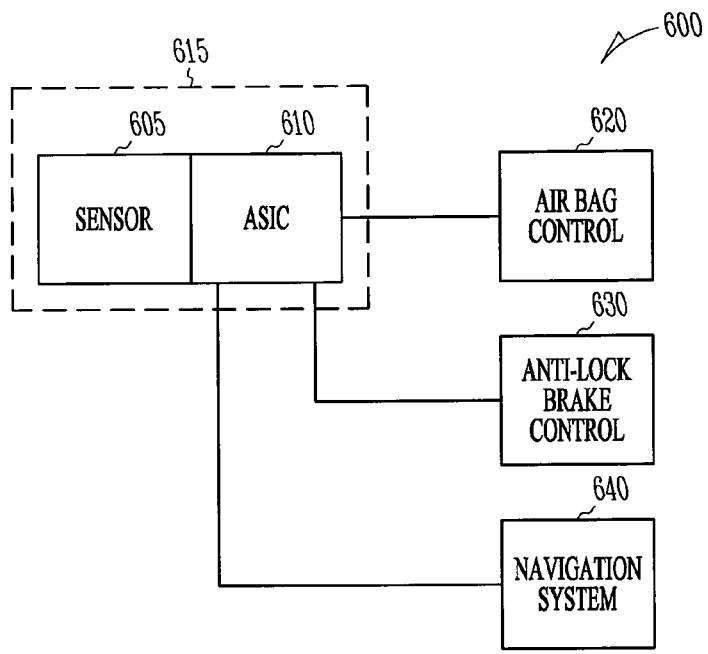
FIG. 6 illustrates another system incorporating an example embodiment.

FIG. 6 illustrates another system incorporating an example embodiment. System 600 may be utilized in a moving vehicle such as an automobile. Sensor 605, such as the sensors illustrated in FIG. 2, FIG. 3 or FIG. 4 may be coupled to an ASIC 610. MEMS 615 is a 3D multi-sensors for 3D acceleration and 3D magnetic field detection in one case, and 3D acceleration for another case ASIC 610 may translate the outputs of sensor 605, to determine acceleration and magnetic field in all three axes. ASIC 610 may provide information to one or more of the following: an airbag control 620, an anti-lock brake control 630, or a navigation system 640. The ASIC may provide acceleration data to the airbag control 620 indicating when the airbag should deploy. In addition, the ASIC 610 may provide both acceleration and magnetic positional information to the anti-lock brake control 630 to indicate the anti-lock brake system should be activated. Finally, the ASIC 610 may provide additional navigational data to the navigation system 640, for example as discussed in FIG. 5, the ASIC may correct for errors from the GPS system.

Figure 7:
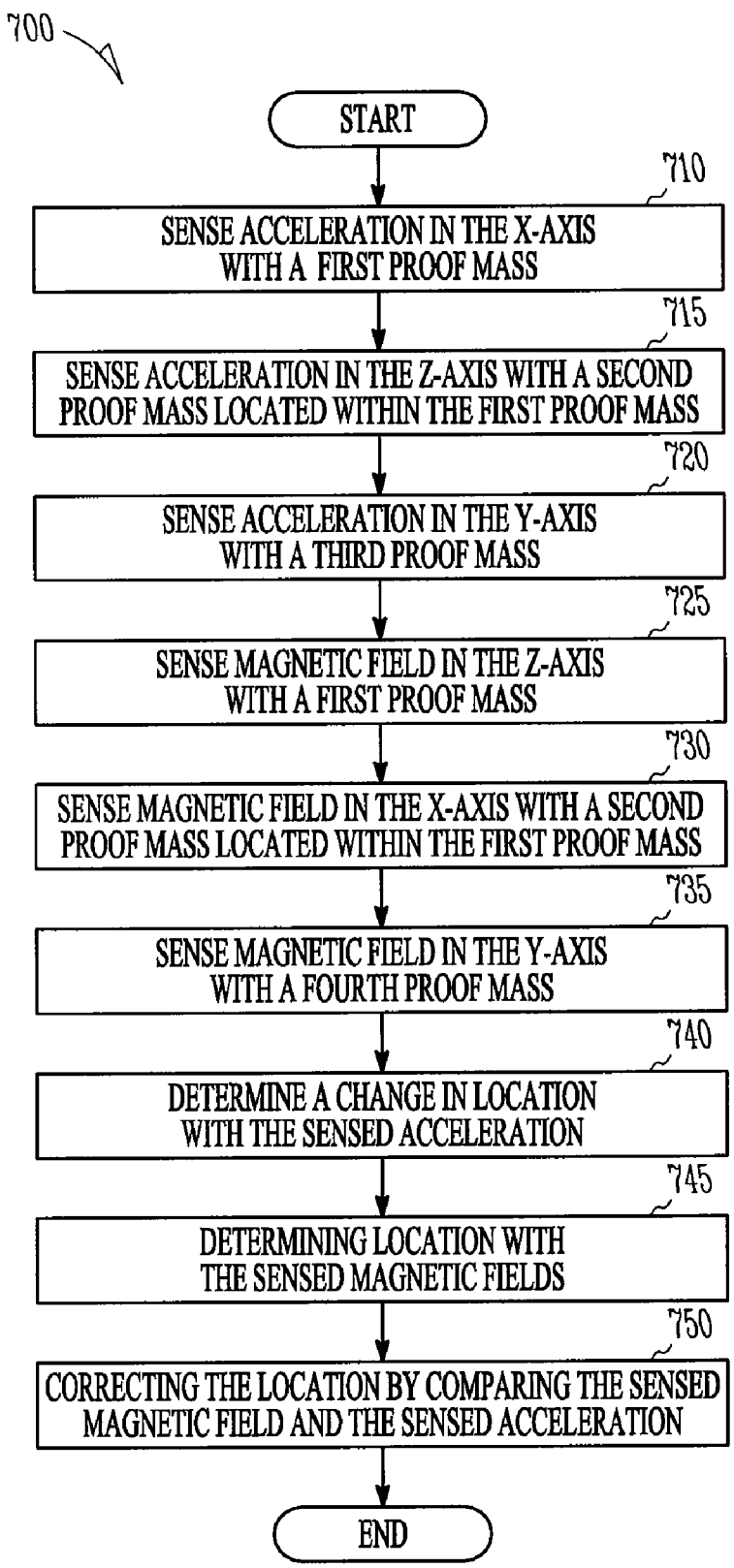
FIG. 7 is a method for determining a change in location according to an example embodiment.

FIG. 7 is a method for determining a change in location according to an example embodiment. The method 700 may include a first activity 710 to sense acceleration in the x-axis with a first proof mass such as proof mass 350 of FIG. 3. Activity 715 may be to sense acceleration in the z-axis with a second proof mass such as proof mass 355 of FIG. 3 located within the first proof mass. Activity 720 may be to sense acceleration in the y-axis with a third proof mass, such as proof mass 360 of FIG. 3. Activity 725 may be to sense a magnetic field in the z-axis with the first proof mass. Activity 730 may be to sense the magnetic field in the x-axis with the second proof mass located within the first proof mass. Activity 735 may be to sense the magnetic field in the third axis with a fourth proof mass, such as proof mass 365 of FIG. 3. Activity 740 may be to determine a change in location from the sensed acceleration in the three axes. Activity 745 may be to determine the location of the sensor with the sensed magnetic fields. Activity 750 may be to correct for the location by comparing the sensed magnetic field with the sensed acceleration.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. The above description and figures illustrate embodiments of the invention to enable those skilled in the art to practice the embodiments of the invention. Thus the following claims are hereby incorporated into the Detailed Description, with each claim standing on its own as a separate embodiment.

What is claimed is:

1. An apparatus comprising:
a first capacitive bridge sensor having a first proof mass supported by a first set of springs to permit movement in a first axis and a first comb capacitive structure responsive to movement of the first proof mass and responsive to magnetic fields; and
a second capacitive bridge sensor having a second proof mass located within the first proof mass, the second proof mass supported by a second set of springs to permit movement in a second axis and a second comb capacitive structure responsive to movement of the first proof mass and responsive to magnetic fields, wherein the first and second comb structures are adapted to utilize differential sidewall capacitive sensing for both movement of the proof masses and magnetic fields.

2. The apparatus of claim 1, wherein the second set of springs is coupled to the first proof mass.

3. The apparatus of claim 2, wherein the first capacitive bridge sensor is adapted to sense acceleration in a first axis and the second capacitive bridge sensor is adapted to sense acceleration in a second axis.

4. The apparatus of claim 2, wherein the first capacitive bridge sensor is adapted to sense a magnetic field in a first axis and the second capacitive bridge sensor is adapted to sense a magnetic field in a second axis.

5. The apparatus of claim 3, wherein the first capacitive bridge sensor is adapted to sense a magnetic field in a second axis and the second capacitive bridge sensor is adapted to sense a magnetic field in a first axis.

6. An apparatus comprising,
an external capacitive bridge sensor having a first proof mass for sensing a first parameter in a first axis;
an internal capacitive bridge sensor having a second proof mass suspended within the first proof mass for sensing the parameter in a second axis; and
a further capacitive bridge sensor having a third proof mass for sensing the parameter in a third axis, wherein each bridge sensor includes comb capacitive structure responsive to movement of a respective proof mass and responsive to magnetic fields, wherein the comb structures are adapted to utilize differential sidewall capacitive sensing for both movement of the proof masses and magnetic fields.

7. The apparatus of claim 6, further comprising an additional internal capacitive bridge sensor having a fourth proof mass suspended within the third proof mass.

8. The apparatus of claim 6, wherein the parameter is acceleration.

9. The apparatus of claim 6, wherein the third proof mass is suspended within the second proof mass.

10. The apparatus of claim 6, wherein the parameter is a magnetic field.

11. The apparatus of claim 10, wherein a current passes through the first, second or third proof mass when detecting the magnetic field.

12. The apparatus of claim 8, wherein the external capacitive bridge sensor is adapted to sense a first magnetic field in the second axis;
the internal capacitive bridge sensor adapted to sense a second magnetic field in the first axis; and
an additional internal capacitive bridge sensor having a fourth proof mass suspended within the third proof mass for sensing a third magnetic field in a third axis.

13. The apparatus of claim 6, further comprising an application-specific integrated chip coupled to the capacitive bridge sensors.

14. The apparatus of claim 6, further comprising an application-specific integrated circuit coupled to the capacitive bridge sensors formed on a chip.

15. The apparatus of claim 13, further comprising a navigation system, wherein an application-specific integrated chip provides an output to the navigation system.

16. A method comprising:
sensing acceleration in a first axis with a first proof mass;
sensing acceleration in a second axis with a second proof mass, the second proof mass being located within the first proof mass;
sensing acceleration in a third axis with a third proof mass;
sensing a first magnetic field in the second axis with the first proof mass;

sensing a second magnetic field in the first axis with the second proof mass, the second proof mass being located within the first proof mass; and sensing a third magnetic field in the third axis with a fourth proof mass.

17. The method of claim 16 further comprising:

determining a change in location from the sensed acceleration in the first axis, the second axis and the third axis.

18. The method of claim 16 further comprising:

determining a location from the sensed first, second, and third magnetic fields.

19. The method of claim 18, correcting the location by comparing the sensed first, second and third magnetic fields, with the sensed acceleration in the first axis, the second axis, and the third axis.

* * * * *